March 7, 1933.  O. JUNGGREN  1,900,561
CONDUIT CONNECTION
Filed May 5, 1931
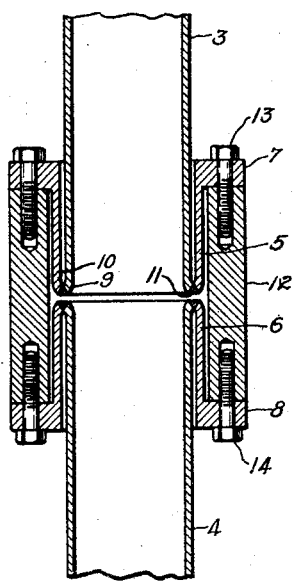
Inventor
Oscar Junggren,
by Charles A. Mullen
His Attorney.

Patented Mar. 7, 1933

1,900,561

UNITED STATES PATENT OFFICE

OSCAR JUNGGREN, OF SCHENECTADY, NEW YORK, ASSIGNOR TO GENERAL ELECTRIC COMPANY, A CORPORATION OF NEW YORK

CONDUIT CONNECTION

Application filed May 5, 1931. Serial No. 535,198.

The present invention refers to conduits for supplying fluid at high temperatures and particularly to the connection between individual parts of such conduit, and also to the connection of the end of such conduits to machine parts, for instance, valves or the like.

It is well known that the connection of conduit parts with each other or with other machine parts involves certain difficulties in view of the fact that the flanges attached to such conduits do not expand at the same rate as the conduits themselves. This causes high stresses and strains upon the bolts which stretch themselves and thus cause leakage of the joint.

The object of my invention is an improved construction of conduit connections in which stresses and strains causing leakage and damage of the different parts are considerably diminished. This is achieved, according to my invention, by the provision of means which allow expansion of the conduit parts in axial, as well as radial direction without imparting substantial stresses and strains to the flanged members.

For a consideration of what I believe to be novel and my invention, attention is directed to the following description and claims in connection with the drawing appended thereto.

In the drawing, I have shown a conduit embodying my invention.

Referring to the drawing, 3 and 4 represent two parts of a conduit, in the present instance shown as two circular pipes to be connected together. According to my invention, as shown in this figure, I provide two tubular members 5 and 6 surrounding the conduit parts 3 and 4 respectively and having flanged portions 7 and 8 respectively. The ends 9 and 10 of the pipes and tubular members respectively are integrally united with each other. This may be achieved by welding these ends together, as indicated in the present instance at 11.

12 illustrates another tubular member or sleeve surrounding the members 5 and 6 and having seating portions to which said flanged portions 7 and 8 are secured by means of bolts 13 and 14 respectively.

It will be noted that the ends of the two pipe parts 3 and 4 are spaced apart from each other to allow axial expansion of the pipes without imparting stresses and strains to the flanged portions and screws. It will also be noted that annular spaces are formed between the different tubular members which provide for radial expansion of these parts.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A conduit having two adjacent parts defining a clearance between them for permitting axial expansion and means for connecting said parts, comprising a tubular member around each of said parts and defining an annular space with said part, one end of each of said tubular members being welded to the end of the corresponding conduit part, the other end of each of said tubular members having a flanged portion, another tubular member surrounding said first mentioned tubular members, and means for connecting said flanged portions to said other tubular member.

2. A conduit having two adjacent parts defining a clearance between them for permitting axial expansion and means for connecting said parts, comprising a tubular member around each of said parts and defining an annular space with said part, one end of each of said tubular members being welded to the end of the corresponding conduit part, the other end of each of said tubular members having a flanged portion, another tubular member surrounding said first mentioned tubular members and defining an annular space with said first mentioned tubular members, and means for connecting said flanged portions to said other tubular member.

In witness whereof, I have hereunto set my hand.

OSCAR JUNGGREN.